Patented Oct. 17, 1950

2,526,585

UNITED STATES PATENT OFFICE 2,526,585

PURIFICATION OF ANHYDROUS HYDROGEN FLUORIDE

Wilbur J. Shenk, Jr., and George R. Pellon, Cleveland, Ohio, assignors to The Harshaw Chemical Company, Cleveland, Ohio, a corporation of Ohio No Drawing. Application July 14, 1948,
Serial No. 38,757

4 Claims. (Cl. 23—153)

This invention relates to treatment of anhydrous hydrogen fluoride and more particularly to the conversion of certain impurities commonly found in the commercial product to less harmful compounds, with or without removal of the resulting less harmful compounds from the anhydrous hydrogen fluoride.

Anhydrous hydrogen fluoride is a commercial product which is produced by reacting fluorspar with sulfuric acid according to the reaction:

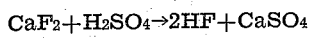

$$CaF_2 + H_2SO_4 \rightarrow 2HF + CaSO_4$$

The anhydrous hydrogen fluoride of commerce so produced contains substantial quantities of water, $SO_2$ and $H_2S$, and sometimes also contains small quantities of organic sulfur compounds, probably derived mainly from the flotation agent used in preparing the fluorspar used for acid production. Water may be present in proportions below 0.5%, usually around 0.1% by weight. $SO_2$ and $H_2S$ together may be present to the extent of two or three-tenths of 1% by weight and organic sulfur compounds in lesser proportions.

It is known that pure anhydrous HF is very inert with respect to steel such as steel shipping drums and steel equipment as well as to other metals such as nickel and copper. It is known, also, that an increase in water content and $SO_2$ content reduce the inertness and render the product more corrosive. It is obvious, then, that if the anhydrous hydrogen fluoride of commerce could be freed of its water and sulfur content, it would be improved with respect to its transportation and use. It has been proposed heretofore to purify the anhydrous hydrogen fluoride of commerce by redistillation for the reduction of the content of moisture and sulfur; but it has been found that even after redistillation, there still remains a small proportion of the $SO_2$ or $H_2S$ and moisture as well as traces of the organic sulfur compounds.

The present invention is concerned with a solution of the above indicated problem which involves the conversion of the sulfur content of anhydrous hydrogen fluoride to the inert compounds, $SO_2F_2$ and $SF_6$, the water content being at the same time converted to HF and oxygen. In accordance with the present invention, $SO_2$ and $H_2S$ are fluorinated to produce the very stable sulfur-fluorine compounds $SO_2F_2$ and $SF_6$ which are exceedingly inert as is well known.

Fluorination at the same time converts the moisture content to hydrogen fluoride and oxygen, and the sulfur in the organic sulfur compounds, which may be present in trace quantities, is converted to $SO_2F_2$ or $SF_6$. In view of the fact that the fluorination of small quantities of impurities is carried out in large quantities of anhydrous HF, it is clear that fluorine gas cannot very well be employed as the fluorinating agent, since traces would remain and contaminate the product.

It has been found that the desired fluorination of $SO_2$, $H_2S$, water and the organic sulfur compounds can be accomplished by passing the commercial anhydrous hydrogen fluoride in vapor phase over solid silver difluoride or solid cobalt trifluoride. The sulfur dioxide or $H_2S$ content is thereby reduced to an exceedingly small proportion, the water is converted to hydrogen fluoride and oxygen and the organic sulfur compounds are broken down and converted to inert compounds. At the same time the silver difluoride or cobalt trifluoride is reduced to silver monofluoride or cobalt difluoride but can be regenerated by fluorination with fluorine gas or chlorine trifluoride. $AgF_2$ or $CoF_3$ may be used as such in the form of granules or powder but is conveniently mounted on $AlF_3$ in the form of porous tablets and these tablets may be used for treatment of anhydrous HF, then subjected to fluorination to convert the AgF or $CoF_2$ back to $AgF_2$ or $CoF_3$ and again used for treatment of HF, the cycle being carried out repeatedly.

Of the heavy metals, the fluorides of which might be expected to behave like those of silver and cobalt, we have tried out those which are readily available and cheap enough to be considered non-precious but we find that because their fluorine is not given up sufficiently readily or possibly for reasons we do not understand, they are ineffective to reduce the active sulfur content of AHF to the low value which we require. Only $AgF_2$ and $CoF_3$ have been found effective to reduce active sulfur to or below .001% by weight.

While commercial AHF (anhydrous hydrogen fluoride) normally contains the sulfur impurities noted, the benefit of the invention may be realized to a considerable extent if the AHF to be treated contains any one of them.

The combined $SO_2$, $H_2S$, $SO_3$ and organic sulfur content of anhydrous HF, which is convertible to sulfate by $HNO_3$ and which is hereinafter referred to as "active sulfur" in contradistinction to the inert sulfur compounds $SO_2F_2$ and $SF_6$, is readily determined by passing the anhydrous HF, containing small proportions of such sulfur compounds into nitric acid. These compounds (except $SO_3$) are oxidized by the nitric acid and they form $H_2SO_4$ therein. The $H_2SO_4$ is then converted to barium sulfate by the addition of barium chloride. It is thus possible to measure the amount of active sulfur before and after passing the anhydrous HF over the silver difluoride or cobalt trifluoride pellets. It has been found possible by the process of the present invention to reduce the active sulfur content to a low proportion, in the order of .001% by weight or less as shown by the nitric acid testing method.

Inasmuch as HF has a boiling point of about 19° C. while $SO_2F_2$ and $SF_6$ have boiling points of —52° C. and —62° C. respectively, it is obvious that by condensation some of these gases may be actually removed from the product. It is not, however, essential to remove them in view of their inert character and, insofar as may be found convenient, they may be left in the AHF without danger of their corroding shipping drums and equipment. For the production of anhydrous HF of the highest possible purity, it may be desirable to follow the treatment of anhydrous HF according to the present invention by one or more distillation steps or to pass it repeatedly over the fluorinating agent or to do both. Absolute purity is, of course, impossible and even where fluorination of impurities is followed by or preceded by one or more distillations, it will still be desirable to have such slight traces of sulfur as may be present, tied up as far as possible in the form of the inert compounds $SO_2F_2$ and $SF_6$.

The temperature of operation according to the invention is not sharply critical but the reaction proceeds at a more satisfactory rate if the temperature is elevated. The reaction goes to a substantial extent at room temperature, but it is desirable that the operation be carried out above 100° C. and optimum temperature is in the range from 200° C. to 250° C. Higher temperatures can be used, but any operating temperature above 350° C. is thought unjustifiable in view of the small increase in the reaction rate. The fluorination may be carried out at atmospheric pressure or at higher or lower pressures according to choice.

The silver difluoride or cobalt trifluoride may be in any desired state of subdivision but preferably is mounted on a porous aluminum fluoride carrier in order to give a large area of contact without being carried along with the gas stream. Suitable tablets or pellets consisting of $AgF_2$ or $CoF_3$ mounted on $AlF_3$ may be prepared as follows:

Tablets or pellets of $Al_2O_3$ may be prepared in any suitable manner as, for example, aluminum hydrate after ignition to $Al_2O_3$ powder at 500° C. may be passed through a Stokes pelleting machine. The resulting $Al_2O_3$ tablets may then be impregnated with a water solution of a silver salt or cobalt salt and then fluorinated by passing anhydrous HF over such tablets for a considerable period of time and then passing fluorine gas over the resulting product whereby to convert the $Al_2O_3$ into $AlF_3$ and the silver salt or cobalt salt to silver difluoride or cobalt trifluoride. It is not essential that the entire tablet be so converted, but a small proportion of oxide may be left at the center without danger that the tablet will crumble in use as would be likely if $AgF_2$ or $CoF_3$ were mounted on $Al_2O_3$ tablets. The $Al_2O_3$ tablets can be fluorinated without the silver or cobalt compound then dipped in a water solution of a silver or cobalt salt, calcined and then fluorinated as before. A mixture of $Al_2O_3$ or $AlF_3$ and AgCl or AgF or $CoCl_2$ or $CoF_2$ may be pelleted, treated with HF and then treated with fluorine gas. The proportion of $AgF_2$ in the pellets may be varied but suitably is from 1% to 40% of the weight of the pellet. Numerous variations in the manufacture of the pellets can be tolerated, and accordingly it is not intended to limit the present invention in its broadest aspect to any particular fluorinating agent other than as indicated in the appended claims.

It is of only limited economic importance to utilize the pellets to the fullest possible extent prior to regeneration. Rather, it is important to avoid using the pellets beyond their useful life in the process, and accordingly regenerations should be more frequent than absolutely necessary rather than the reverse. The active period between regenerations is not sharply limited but toward the end of its useful life the activity of the pellets falls off fairly rapidly as the silver difluoride or cobalt trifluoride becomes converted to silver monofluoride or cobalt difluoride. The theoretical weight of silver difluoride or cobalt trifluoride required for the conversion of the $SO_2$ and other active sulfur compounds and water to $SO_2F_2$, $SF_6$ and HF can be calculated as well as the amount of fluorine theoretically available from a given weight of pellets, but the pellets should not be expected to supply more than about 50% by weight of their theoretically available fluorine before regeneration.

The following specific examples will serve to illustrate the invention:

*Example I*

A quantity of $Al_2O_3$ was made into tablets of a generally cylindrical shape of a diameter of 0.191". These tablets had an average crushing strength of 8 pounds and an apparent density of 1.34. They were dipped in a 20% aqueous solution of AgF for a period of one hour, removed from the solution, placed on the nickel trays of a nickel tube furnace and treated with a stream of anhydrous HF at 550° C. for 24 hours. They were then treated with $F_2$ gas within a temperature range from 150 to 250° C. for 3 hours and were then ready for use. They had an average apparent density of 2.14, an average crushing strength of 23.7 pounds and assayed 7.5% as $AgF_2$. Crushing strength is the weight required to fracture one tablet between parallel flat surfaces in contact with opposed portions of the cylindrical surface of the tablet.

*Example II*

A 1.37" inside diameter nickel tube was packed with 340 grams of the pellets prepared according to Example I. The free space in this column was calculated to be 120 cc. The temperature in the column was maintained at approximately 250° C. HF vapor containing 0.33% $SO_2$ was passed at atmospheric pressure through the tablets at various speeds and for various times and the $SO_2$, $H_2S$ and other active sulfur remaining in the anhydrous HF after passage through the column was determined by the above indicated method of absorbing it in nitric acid. Before each run, the pellets were treated at 250° C. with fluorine gas for regeneration to full strength.

An excess of $F_2$ was employed in order to insure complete conversion of AgF to $AgF_2$. The results of these runs are tabulated below:

| Run | HF Flow, gms./min. | Time of Flow, Min. | Total HF, g. (calculated) | $SO_2$,[1] Per cent by weight Feed | $SO_2$,[1] Per cent by weight product |
|---|---|---|---|---|---|
| 1 | .45 | 130 | 58.5 | 0.33 | [2] 0.002 |
| 2 | 1.14 | 60 | 68.4 | 0.33 | 0.0008 |
| 3 | 1.62 | 40 | 64.8 | 0.33 | 0.0008 |
| 4 | 2.58 | 36 | 92.9 | 0.33 | 0.0008 |
| 5 | 4.68 | 24 | 112.3 | 0.33 | 0.0006 |
| 6 | 11.1 | 22 | 244.2 | 0.33 | [2] 0.002 |
| 7 | 14.4 | 16 | 230.4 | 0.33 | 0.0006 |

[1] This value, assumed to be entirely $SO_2$ but containing traces of $H_2S$ and organic sulfur, was determined by passing a known weight of HF into $HNO_3$, measuring the $H_2SO_4$ formed in the nitric acid and calculating to $SO_2$.

[2] The variations in runs 1 and 6 from the other runs are not considered significant but are within the probable error of the experiment. The percentage of $SO_2$ plus other active sulfur remaining in the anhydrous HF may be considered to be in the order of 0.001% for all runs.

*Example III*

A quantity of $Al_2O_3$ approximately 1945 g. was made into tablets of a cylindrical shape of a diameter of 0.128" and an average length of 0.140". These tablets were dipped for 10 minutes in a 60% aqueous $AgNO_3$ solution and calcined at 500° C. The resulting tablets weighed 2400 g. and contained 21.0% silver. These were treated with anhydrous HF at a rate of 200 g. per hour for 16 hours at 550° C. and then with $F_2$ at a rate of 100 g. per hour for six hours at a maximum temperature of 250° C. The resulting tablets weighed 3560 g. and assayed 19.5% $AgF_2$.

*Example IV*

The reactor described in Example II was loaded with 445 g. of the pellets prepared according to Example III, and a series of experiments similar to those described in Example II were carried out. The free space in this column was calculated to be 143 cc. The results of these runs are tabulated below:

| Run | HF Flow, gms./min. | Time of Flow, Min. | Total HF, gms. (calculated) | $SO_2$,[1] Per cent by weight Feed | $SO_2$,[1] Per cent by weight product |
|---|---|---|---|---|---|
| 1 | 5.5 | 66.3 | 365 | 0.33 | 0.0001 |
| 2 | 10.2 | 37.2 | 380 | 0.33 | 0.0007 |
| 3 | 14.2 | 27.8 | 395 | 0.33 | 0.0009 |
| 4 | 12.0 | 150 | 1,800 | 0.27 | 0.0005 |
| 5 | 3.1 | 678 | 2,100 | 0.22 | 0.0003 |

[1] This value, assumed to be entirely $SO_2$ but containing traces of $H_2S$ and organic sulfur, was determined by passing a known weight of HF into $HNO_3$, measuring the $H_2SO_4$ formed in the nitric acid and calculating to $SO_2$.

*Example V*

A 1.87" inside diameter nickel tube was packed with 1180 g. of $CoF_3$—$AlF_3$ tablets which had been prepared according to the method described in Example III except that a 50% $Co(NO_3)_2$ solution was used in place of the 60% $AgNO_3$ solution. The tablets assayed 10.8% $CoF_3$ and the free space in the column was calculated to be 420 ml. AHF was passed through the column at various rates and temperatures. The results of these runs are tabulated below:

| Run | Temp., °C. | HF Flow, g./min. | Total HF, gms. | $SO_2$, Per cent by wt. Feed | $SO_2$, Per cent by weight Product |
|---|---|---|---|---|---|
| 1 | 250 | 11.0 | 1,450 | .20 | .0006 |
| 2 | 350 | 3.0 | 330 | .18 | .0011 |

Having thus described our invention, what we claim is:

1. A process for conditioning anhydrous hydrogen fluoride, containing sulfur dioxide as an impurity, the step of passing such anhydrous hydrogen fluoride over a mass of solid, heavy metal fluoride fluorinating agent of the class consisting of $AgF_2$ and $CoF_3$, said fluorinating agent being extended on the surface of a porous aluminum fluoride carrier, the flow of anhydrous hydrogen fluoride over said fluorinating agent being continued until a substantial proportion but less than all of the said fluorinating agent has been reduced to a compound having one less fluorine atom, and stopping the flow of anhydrous hydrogen fluoride before the total amount thereof passed over said mass of fluorinating agent is such that its total sulfur content is equal to the amount theoretically required to reduce all of said fluorinating agent to a compound having one less atom of fluorine.

2. A process for conditioning anhydrous hydrogen fluoride, containing sulfur dioxide as an impurity, the step of passing such anhydrous hydrogen fluoride in vapor phase over a mass of solid, heavy metal fluoride fluorinating agent of the class consisting of $AgF_2$ and $CoF_3$, said fluorinating agent being extended on the surface of a porous aluminum fluoride carrier, the flow of anhydrous hydrogen fluoride over said fluorinating agent being continued until a substantial proportion but less than 50% of the said fluorinating agent has been reduced to a compound having one less fluorine atom, and stopping the flow of anhydrous hydrogen fluoride before the total amount thereof passed over said mass of fluorinating agent is such that its total sulfur content is equal to 50% of the amount theoretically required to reduce all of said fluorinating agent to a compound having one less atom of fluorine.

3. In a process for conditioning substantially anhydrous hydrogen fluoride containing sulfur dioxide as an impurity, the step of passing such anhydrous hydrogen fluoride in vapor phase over a mass of solid particles of a fluorinating agent composed of aluminum fluoride as a carrier and silver difluoride as a fluorinating agent extended on the surface of said carrier, the flow of anhydrous hydrogen fluoride over said fluorinating agent being continued until a substantial amount thereof has been conditioned to reduce the sulfur content below 0.002% by weight, and discontinuing the flow before the total amount of sulfur removed from said anhydrous hydrogen fluoride is equal to 50% of the theoretical amount required to reduce all of said fluorinating agent to AgF, the total amount of anhydrous HF passed over said fluorinating agent being less than an amount having a sulfur content equal to 50% of the amount theoretically required to reduce all the $AgF_2$ to AgF.

4. In a process for conditioning substantially anhydrous hydrogen fluoride containing sulfur dioxide as an impurity, the step of passing such anhydrous hydrogen fluoride in vapor phase over a mass of solid particles of a fluorinating agent composed of aluminum fluoride as a carrier and cobalt trifluoride as a fluorinating agent extended on the surface of said carrier, the flow of anhydrous hydrogen fluoride over said fluorinating agent being continued until a substantial amount thereof has been conditioned to reduce the sulfur content below 0.002% by weight, and discontinuing the flow before the total amount of sulfur removed from said anhydrous hydrogen fluoride is equal to 50% of the theoretical amount required to reduce all of said fluorinating agent to $CoF_2$, the total amount of anhydrous HF passed over said fluorinating agent being less than an amount having a sulfur content equal to 50% of the amount theoretically required to reduce all the $CoF_3$ to $CoF_2$.

WILBUR J. SHENK, JR.
GEORGE R. PELLON.

REFERENCES CITED

The following references are of record in the file of this patent:

UNITED STATES PATENTS

| Number | Name | Date |
|---|---|---|
| 2,382,788 | Gorin | Aug. 14, 1945 |

OTHER REFERENCES

Ruff et al.: Z. Anorg. und Allg. Chem.; 219, 147–148 (1934).

Gmelin-Kraut: Handbuch der Anorganisch Chemie, 1. 2, Heidelberg, 1909, p. 15.

Benner et al.: Ind. and Eng. Chemistry, vol. 39, March 1947, p. 329.